US011706712B2

(12) United States Patent
Silva et al.

(10) Patent No.: US 11,706,712 B2
(45) Date of Patent: Jul. 18, 2023

(54) ELASTIC RESOURCE CONTROL IN A CONTAINER ORCHESTRATION ENVIRONMENT

(71) Applicant: International Business Machines Corporation, Armonk, NY (US)

(72) Inventors: Guillermo Jesus Silva, Cedar Park, TX (US); Malcolm S. Allen-Ware, Tucson, AZ (US); Charles Lefurgy, Austin, TX (US); Peter Donovan, Cary, NC (US); Balaji Ramamoorthy, Plainville, MA (US); David Ohlemacher, Merrimack, NH (US)

(73) Assignee: International Business Machines Corporation, Armonk, NY (US)

( * ) Notice: Subject to any disclaimer, the term of this patent is extended or adjusted under 35 U.S.C. 154(b) by 251 days.

(21) Appl. No.: 16/525,767

(22) Filed: Jul. 30, 2019

(65) Prior Publication Data

US 2021/0037466 A1     Feb. 4, 2021

(51) Int. Cl.
*H04W 52/02*     (2009.01)
*G06F 9/54*       (2006.01)
(Continued)

(52) U.S. Cl.
CPC .......... *H04W 52/0219* (2013.01); *G06F 1/28* (2013.01); *G06F 1/3209* (2013.01); *G06F 9/542* (2013.01)

(58) Field of Classification Search
CPC .... H05W 52/0219; G06F 1/28; G06F 1/3209; G06F 9/542
See application file for complete search history.

(56) References Cited

U.S. PATENT DOCUMENTS 6,795,928 B2   9/2004   Bradley et al.
6,996,728 B2   2/2006   Singh
(Continued)

FOREIGN PATENT DOCUMENTS

WO    WO2016057930 A1    4/2016

OTHER PUBLICATIONS

Joy et al., "A Study on Energy Efficent Cloud Computing,", 2015 IEEE International Conference on Computational Intelligence and Computing Research, Madurai, India, Dec. 10-12, 2015, 6 pages.
(Continued)

*Primary Examiner* — Jaweed A Abbaszadeh
*Assistant Examiner* — Hyun Soo Kim
(74) *Attorney, Agent, or Firm* — Yee & Associates, P.C.

(57) ABSTRACT

Controlling server power usage in a data center is provided. Power usage among a plurality of server racks in active mode processing a set of workloads in the data center is managed. It is detected that a new server rack in standby mode is being added to the plurality of server racks. It is ensured that the new server rack in the standby mode is properly controlled and monitored prior to transitioning the new server rack to the active mode. It is determined whether power safety criteria are met to safely join the new server rack to the plurality of server racks prior to transitioning the new server rack from the standby mode to the active mode. The new server rack is transitioned to the active mode in without exceeding a power budget for the plurality of server racks in response to determining that the power safety criteria are met.

14 Claims, 8 Drawing Sheets

(51) Int. Cl.
*G06F 1/3209* (2019.01)
*G06F 1/28* (2006.01)

(56) References Cited

U.S. PATENT DOCUMENTS

| | | | |
|---|---|---|---|
| 7,756,972 | B2 | 7/2010 | Ma |
| 8,230,249 | B2 | 7/2012 | Dasgupta et al. |
| 8,341,254 | B2 | 12/2012 | Devarakonda et al. |
| 9,298,247 | B2 | 3/2016 | Drake et al. |
| 9,684,366 | B2 | 6/2017 | Allen-Ware et al. |
| 9,766,670 | B1* | 9/2017 | Czamara .................. G06F 1/26 |
| 10,205,675 | B2 | 2/2019 | Chen et al. |
| 2003/0005339 | A1* | 1/2003 | Cohen ...................... G06F 1/26 713/300 |
| 2006/0230299 | A1* | 10/2006 | Zaretsky ................. G06F 1/189 713/320 |
| 2007/0300083 | A1* | 12/2007 | Goodrum .............. G06F 1/3203 713/300 |
| 2008/0178029 | A1* | 7/2008 | McGrane .............. G06F 1/3246 713/320 |
| 2009/0106571 | A1 | 4/2009 | Low et al. |
| 2009/0222562 | A1 | 9/2009 | Liu et al. |
| 2010/0016136 | A1 | 6/2010 | Dawson et al. |
| 2010/0161368 | A1 | 6/2010 | Dawson et al. |
| 2011/0289327 | A1* | 11/2011 | Nolterieke ................ G06F 1/26 713/300 |
| 2012/0072745 | A1* | 3/2012 | Ahluwalia ................ G06F 1/26 713/320 |
| 2015/0051749 | A1* | 2/2015 | Hancock ................ G06Q 50/06 700/295 |
| 2018/0309630 | A1 | 10/2018 | Zhao et al. |
| 2018/0373548 | A1* | 12/2018 | Nassoura .............. G06F 1/3215 |
| 2019/0004579 | A1 | 1/2019 | Allen-Ware et al. |
| 2019/0034237 | A1 | 1/2019 | Siddappa et al. |
| 2019/0171276 | A1* | 6/2019 | Lin ....................... G06F 1/3287 |
| 2020/0042068 | A1* | 2/2020 | Rong .................... G06F 1/3203 |

OTHER PUBLICATIONS

Berl et al., "Energy-Efficent Cloud Computing," The Computer Journal, 2009, Published by Oxford University Press on behalf of the British Computer Society, 7 pages.

IBM, "Managing Data Center Power Efficiency using Green Machine Profiling," An IP.com Prior Art Database Technical Disclosure, ip.com, Mar. 3, 2009, IPCOM000179947D, 3 pages.

Mell et al., "The NIST Definition of Cloud Computing", Computer Security Division, National Institute of Standards and Technology, Jan. 2011, 7 pages.

\* cited by examiner

ELASTIC RESOURCE CONTROL IN A CONTAINER ORCHESTRATION ENVIRONMENT

BACKGROUND

1. Field

The disclosure relates generally to power usage management and more specifically to controlling elastic resource electric power usage in a data center of a container orchestration environment and growing an existing data center within the constraints of available electric power.

2. Description of the Related Art

Power management controls electrical power usage by electric power consumers. Power management ensures that electrical power usage by electric power consumers is safe and efficient. If power consumption is greater than power production capacity, power management may use load throttling to avoid total power loss. Other features of power management may include automatic start and stop of electric power consumers as load varies.

SUMMARY

According to one illustrative embodiment, a computer-implemented method for controlling server power usage in a data center is provided. Power usage among a plurality of server racks in active mode processing a set of workloads in the data center is managed using a software-defined power architecture. It is detected, using a resource inventory manager, that a new server rack in standby mode without a workload is being added to the plurality of server racks in the active mode processing the set of workloads in the data center. It is ensured that the new server rack in the standby mode is properly controlled and monitored by a new software-defined power worker service in the software-defined power architecture prior to transitioning the new server rack to the active mode. It is determined, using the software-defined power architecture, whether power safety criteria are met to safely join the new server rack to the plurality of server racks prior to transitioning the new server rack from the standby mode to the active mode. The new server rack is transitioned, using a boot manager, from the standby mode to the active mode in a safe manner without exceeding a power budget for the plurality of server racks in response to the software-defined power architecture determining that the power safety criteria are met. According to other illustrative embodiments, a computer system and computer program product for controlling server power usage in a data center are provided.

DETAILED DESCRIPTION

Figure 1:
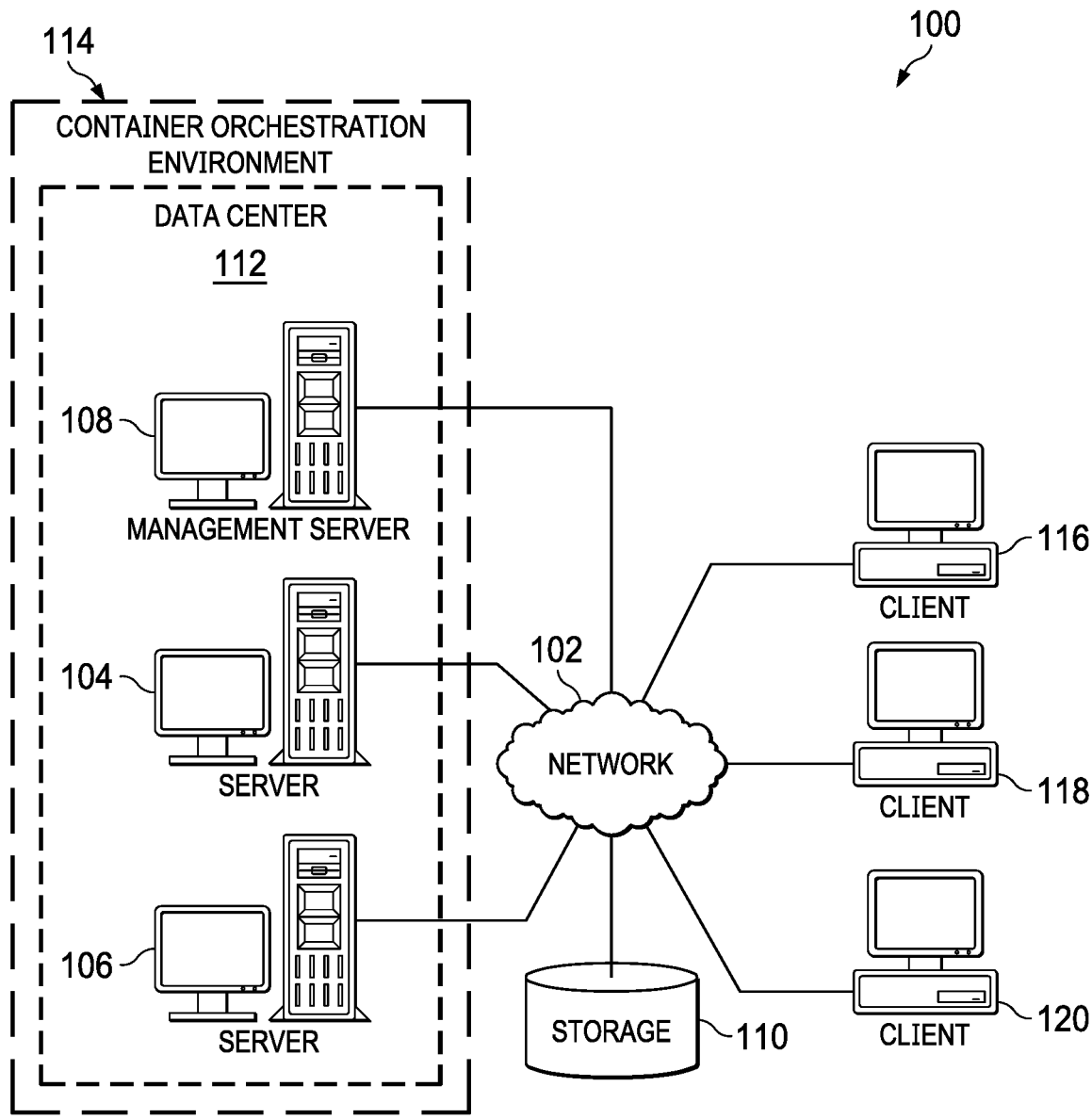
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-5, diagrams of data processing environments are provided in which illustrative embodiments may be implemented. It should be appreciated that FIGS. 1-5 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104, server 106, and management server 108 connect to network 102, along with storage 110. Server 104, server 106, and management server 108 may be server computers with high-speed connections to network 102. In this example, server 104, server 106, and management server 108 are located locally within data center 112 of container orchestration environment 114. However, in an alternative illustrative embodiment, management server 108 may be located remotely and manage server electric power usage for a plurality of data centers. Container orchestration environment 114 may be, for example, an open source Kubernetes cloud environment, which provides automatic deployment, scaling, and management of containerized applications.

Server 104 and server 106 may represent physical servers and virtual servers. In addition, server 104 and server 106 may provide one or more services, such as, for example, event monitoring services, financial services, banking services, governmental services, educational services, reservation services, streaming data services, data retrieval services, and the like, to client devices. Also, it should be noted that server 104 and server 106 may each represent a plurality of racks of servers.

Management server 108 controls and monitors electric power usage of server 104 and server 106. It should be noted that another service (not shown) manages the resource inventory of data center 112 and is used to detect the presence of a new server or rack of servers. Management server 108 manages power consumption of server 104 and server 106, especially when a new server or a rack of servers is being installed and added to data center 112, without exceeding a defined power budget constraint for data center 112, while server 104 and server 106 are in active mode and processing one or more workloads. Management server 108 manages the server power usage budget for data center 112 while adding a new server or server rack to data center 112 based on meeting power safety criteria to prevent circuit breakers from tripping to increase availability and reliability of data center 112. The power safety criteria may include, for example, confirming that power usage measurements are being generated and monitored for the new server or server rack, confirming that a maximum power usage for all servers within data center 112 does not exceed the defined power usage budget constraint for data center 112, and confirming that it is safe to transition the new server or server rack from standby mode to active mode based on determining that the maximum power usage for all servers, which includes the new server or server rack, does not exceed the defined power usage budget constraint when powering on the new server or server rack.

Client 116, client 118, and client 120 also connect to network 102. Clients 116, 118, and 120 are clients of server 104 and server 106. In this example, clients 116, 118, and 120 are shown as desktop or personal computers with wire communication links to network 102. However, it should be noted that clients 116, 118, and 120 are examples only and may represent other types of data processing systems, such as, for example, network computers, laptop computers, handheld computers, smart phones, smart watches, smart televisions, smart appliances, gaming devices, kiosks, and the like. Users of clients 116, 118, and 120 may utilize clients 116, 118, and 120 to access and utilize the services provided by server 104 and server 106.

Storage 110 is a network storage device capable of storing any type of data in a structured format or an unstructured format. In addition, storage 110 may represent a plurality of network storage devices. Further, storage 110 may store identifiers and network addresses for a plurality of servers, identifiers and network addresses for a plurality of client devices, identifiers for a plurality of client device users, defined server power usage budgets, server power consumption data, and the like. Furthermore, storage 110 may store other types of data, such as authentication or credential data that may include user names, passwords, and biometric data associated with system administrators and users, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on management server 108 and downloaded to server 104 over network 102 for use on server 104.

In the depicted example, network data processing system 100 may be implemented as a number of different types of communication networks, such as, for example, an internet, an intranet, a local area network (LAN), a wide area network (WAN), a telecommunications network, or any combination thereof. FIG. 1 is intended as an example only, and not as an architectural limitation for the different illustrative embodiments.

Figure 2:
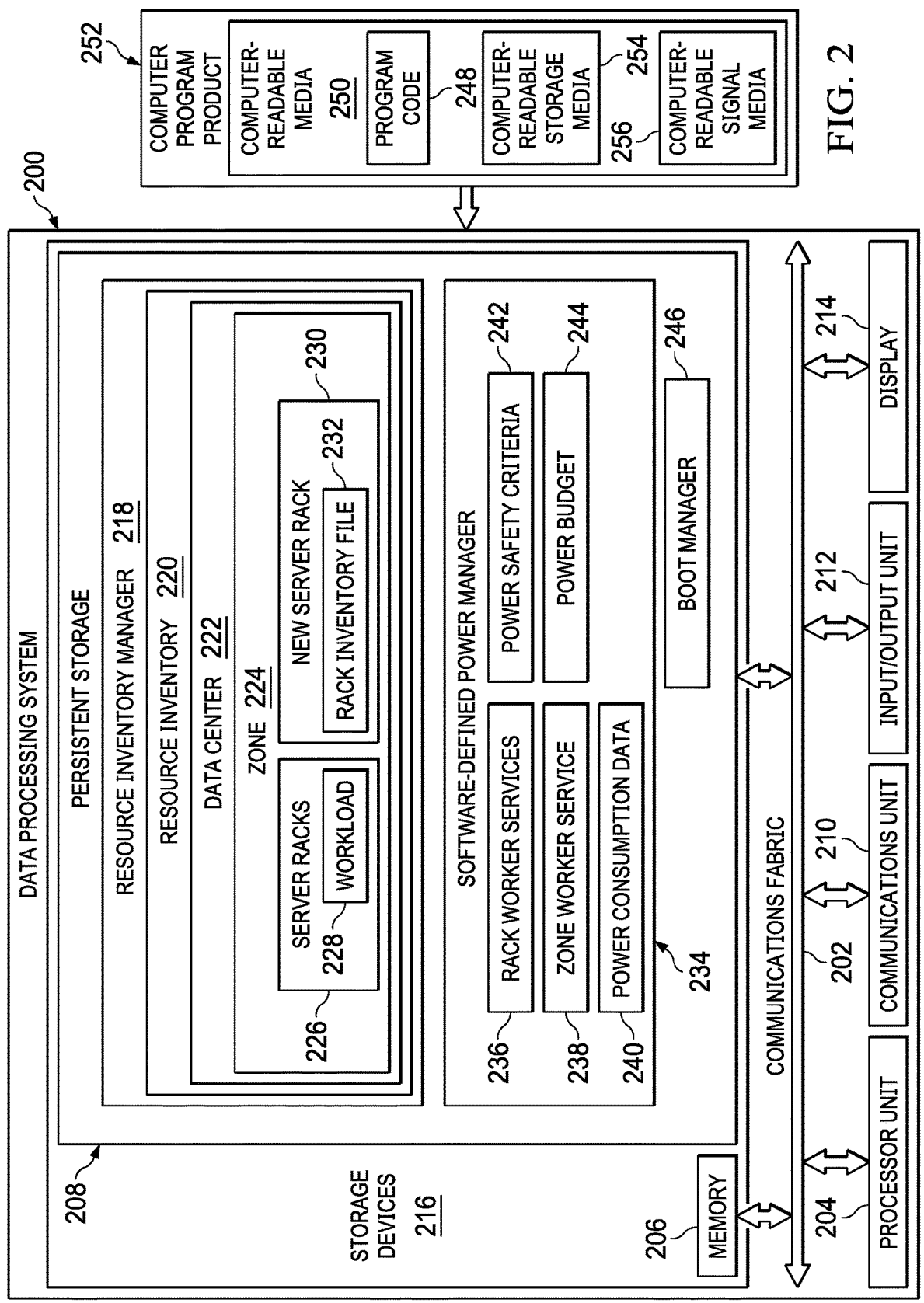
FIG. 2 is a diagram of a data processing system in which illustrative embodiments may be implemented.

With reference now to FIG. 2, a diagram of a data processing system is depicted in accordance with an illustrative embodiment. Data processing system 200 is an example of a computer, such as management server 108 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory (RAM), or any other suitable volatile or non-volatile storage device. Persistent storage 208 may take various forms, depending on the particular implementation. For example, persistent storage 208 may contain one or more devices. For example, persistent storage 208 may be a hard disk drive, a solid-state drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores resource inventory manager 218, software-defined power manager 234, and boot manager 246. However, it should be noted that even though resource inventory manager 218, software-defined power manager 234, and boot manager 246 are illustrated as residing in persistent storage 208, in an alternative illustrative embodiment resource inventory manager 218, software-defined power manager 234, and boot manager 246 may be separate components of data processing system 200. For example, resource inventory manager 218, software-defined power manager 234, and boot manager 246 may be hardware components coupled to communication fabric 202 or a combination of hardware and software components.

Resource inventory manager 218 monitors and controls resource inventory 220 of data center 222. Resource inventory 220 represents a list of hardware resources (e.g., servers) contained in data center 222. Data center 222 represents an identifier of a respective data center and may identify, for example, data center 112 in FIG. 1.

Data center 222 includes zone 224. Zone 224 may be, for example, a fault zone, a service level agreement zone, or the like. In addition, zone 224 may represent a plurality of different zones within data center 222.

Zone 224 includes server racks 226. Server racks 226 represent a set of one or more server racks in active mode running workload 228. A server rack in server racks 226 includes a plurality of hardware servers. Workload 228 represents a set of one or more workloads executed by server racks 226. Workload 228 may represent any type of data processing workload or service provided to client devices, such as, for example, clients 116-120 in FIG. 1.

New server rack 230 represents a rack of servers in standby mode, without a workload, which resource inventory manager 218 is to add to zone 224. However, it should be noted that new server rack 230 may represent a single server that is to be added to zone 224 and not an entire rack of servers. Rack inventory file 232 represents information regarding new server rack 230. Resource inventory manager 218 utilizes the information in rack inventory file 232 to monitor and control new server rack 230 in standby mode.

Software-defined power manager 234 utilizes rack worker services 236 to collect and monitor power consumption data 240 corresponding to server racks 226 in active mode processing workload 228. Software-defined power manager 234 utilizes one rack worker service in rack worker services 236 to collect and monitor power consumption data for a respective rack of servers. Software-defined power manager 234 utilizes zone worker service 238 to collect and monitor electric power data corresponding to a remote power panel corresponding to zone 224. Rack worker services 236 and zone worker service 238 reside in zone 224. It should be noted that each of the rack and zone workers does not occupy an entire computing node, but is a service running on the management rack. Power consumption data 240 represents a total amount of electric power used by server racks 226 and new server rack 230.

Software-defined power manager 234 ensures that power consumption data 240 satisfies power safety criteria 242 and power budget 244. Software-defined power manager 234 utilizes power safety criteria 242 to determine whether new server rack 230 is able to be safely added to zone 224 without tripping the circuit breakers of the remote power panel by staying within power budget 244. For example, power safety criteria 242 may include confirming that power usage consumption data are being generated and monitored for new server rack 230, confirming that a maximum power usage for all servers within zone 224 does not exceed power budget 244 corresponding to zone 224, confirming that it is safe to transition new server rack 230 from standby mode to active mode based on determining that the maximum power usage for all servers within zone 224 does not exceed power budget 244 when powering on new server rack 230, and the like. Power budget 244 represents a predefined electric power budget constraint corresponding to zone 224. Software-defined power manager 234 calculates a redistribution of power budget 244 across each of the server racks in server racks 226 and new server rack 230 to stay within power budget 244 based on power consumption data 240 and power safety criteria 242.

After receiving a confirmation that it is safe to transition new server rack 230 from standby mode to active mode, boot manager 246 transitions new server rack 230 from the standby mode to an active mode to assist server racks 226 in processing workload 228. Boot manager 246 begins a deploy boot process (e.g., iPXE, Petaboot, or the like), which includes power up of new server rack 230. Furthermore, boot manager 246 joins new server rack 230 to zone 224 without exceeding power budget 244 to increase reliability and availability of data center 222. Boot manager 246 may, for example, manage deployment and upgrades of the servers, container orchestration environment, and control plane.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 248 is located in a functional form on computer readable media 250 that is selectively removable and may be loaded onto or transferred to data processing system 200 for running by processor unit 204. Program code 248 and computer readable media 250 form computer program product 252. In one example, computer readable media 250 may be computer readable storage media 254 or computer readable signal media 256. Computer readable storage media 254 may include, for example, an optical or magnetic disc that is inserted or placed into a drive or other device that is part of persistent storage 208 for transfer onto a storage device, such as a hard drive, that is part of persistent storage 208. Computer readable storage media 254 also may take the form of a persistent storage, such as a hard drive, a thumb drive, or a flash memory that is connected to data processing system 200. In some instances, computer readable storage media 254 may not be removable from data processing system 200.

Alternatively, program code 248 may be transferred to data processing system 200 using computer readable signal media 256. Computer readable signal media 256 may be, for example, a propagated data signal containing program code 248. For example, computer readable signal media 256 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 248 may be downloaded over a network to persistent storage 208 from another device or data processing system through computer readable signal media 256 for use within data processing system 200. For instance, program code stored in a computer readable storage media in a data processing system may be downloaded over a network from the data processing system to data processing system 200. The data processing system providing program code 248 may be a server computer, a client computer, or some other device capable of storing and transmitting program code 248.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 254 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

It is understood that although this disclosure includes a detailed description on cloud computing, implementation of the teachings recited herein are not limited to a cloud computing environment. Rather, illustrative embodiments are capable of being implemented in conjunction with any other type of computing environment now known or later developed. Cloud computing is a model of service delivery for enabling convenient, on-demand network access to a shared pool of configurable computing resources, such as, for example, networks, network bandwidth, servers, processing, memory, storage, applications, virtual machines, and services, which can be rapidly provisioned and released with minimal management effort or interaction with a provider of the service. This cloud model may include at least five characteristics, at least three service models, and at least four deployment models.

The characteristics may include, for example, on-demand self-service, broad network access, resource pooling, rapid elasticity, and measured service. On-demand self-service allows a cloud consumer to unilaterally provision computing capabilities, such as server time and network storage, as needed automatically without requiring human interaction with the service's provider. Broad network access provides for capabilities that are available over a network and accessed through standard mechanisms that promote use by heterogeneous thin or thick client platforms, such as, for example, mobile phones, laptops, and personal digital assistants. Resource pooling allows the provider's computing resources to be pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction, such as, for example, country, state, or data center. Rapid elasticity provides for capabilities that can be rapidly and elastically provisioned, in some cases automatically, to quickly scale out and rapidly released to quickly scale in. To the consumer, the capabilities available for provisioning often appear to be unlimited and can be purchased in any quantity at any time. Measured service allows cloud systems to automatically control and optimize resource use by leveraging a metering capability at some level of abstraction appropriate to the type of service, such as, for example, storage, processing, bandwidth, and active user accounts. Resource usage can be monitored, controlled, and reported providing transparency for both the provider and consumer of the utilized service.

Service models may include, for example, Software as a Service (SaaS), Platform as a Service (PaaS), and Infrastructure as a Service (IaaS). Software as a Service is the capability provided to the consumer to use the provider's applications running on a cloud infrastructure. The applications are accessible from various client devices through a thin client interface, such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service is the capability provided to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service is the capability provided to the consumer to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components, such as, for example, host firewalls.

Deployment models may include, for example, a private cloud, community cloud, public cloud, and hybrid cloud. A private cloud is a cloud infrastructure operated solely for an organization. The private cloud may be managed by the organization or a third party and may exist on-premises or off-premises. A community cloud is a cloud infrastructure shared by several organizations and supports a specific community that has shared concerns, such as, for example, mission, security requirements, policy, and compliance considerations. The community cloud may be managed by the organizations or a third party and may exist on-premises or off-premises. A public cloud is a cloud infrastructure made available to the general public or a large industry group and is owned by an organization selling cloud services. A hybrid cloud is a cloud infrastructure composed of two or more clouds, such as, for example, private, community, and public clouds, which remain as unique entities, but are bound together by standardized or proprietary technology that enables data and application portability, such as, for example, cloud bursting for load-balancing between clouds.

A cloud computing environment is service oriented with a focus on statelessness, low coupling, modularity, and semantic interoperability. At the heart of cloud computing is an infrastructure comprising a network of interconnected nodes.

Figure 3:
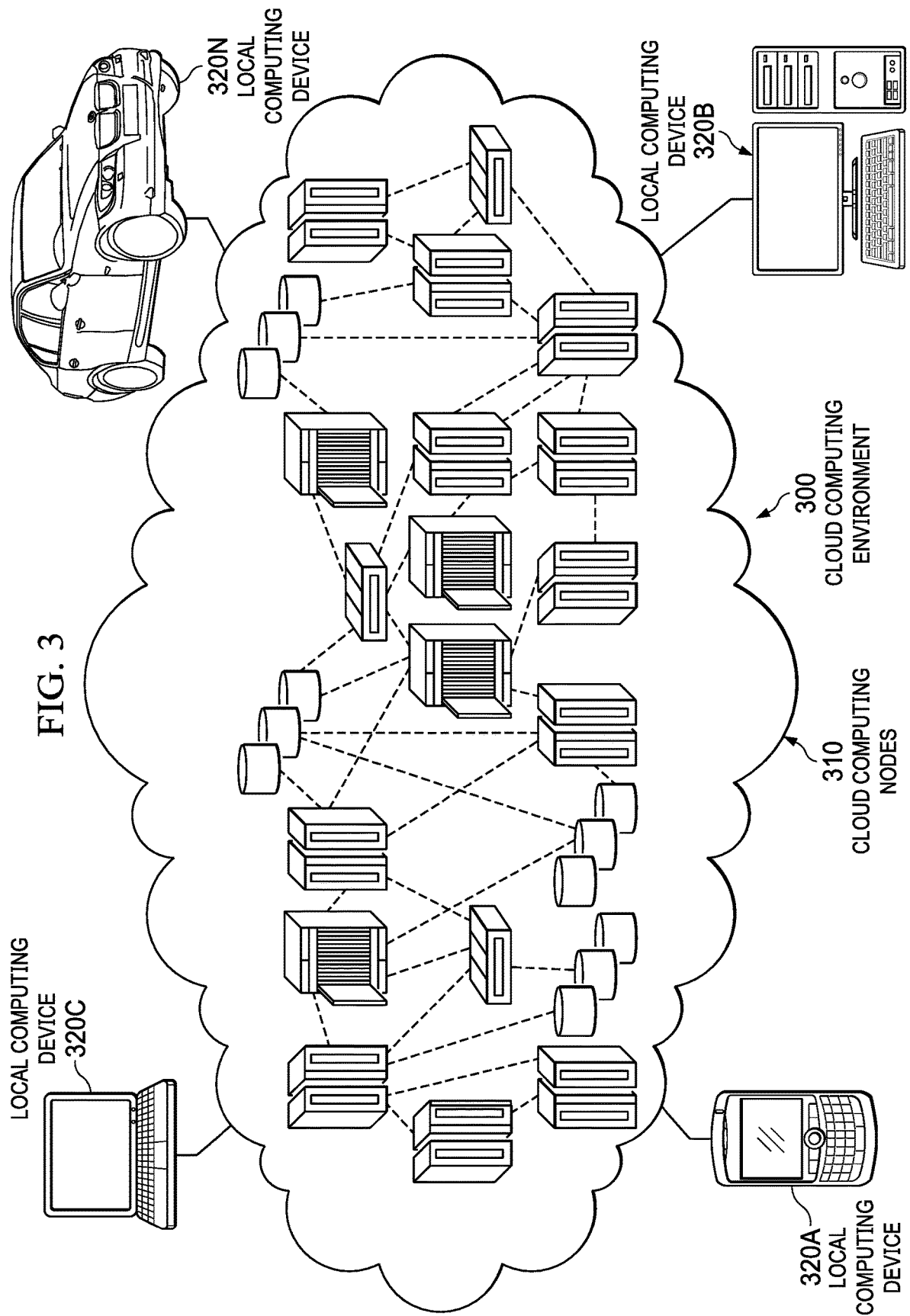
FIG. 3 is a diagram illustrating a cloud computing environment in which illustrative embodiments may be implemented.

With reference now to FIG. 3, a diagram illustrating a cloud computing environment is depicted in which illustrative embodiments may be implemented. In this illustrative example, cloud computing environment 300 includes a set of one or more cloud computing nodes 310 with which local computing devices used by cloud consumers, such as, for example, personal digital assistant or a smart phone 320A, desktop computer 320B, laptop computer 320C, and/or automobile computer system 320N, may communicate. Cloud computing nodes 310 may be, for example, server 104, server 106, and management server 108 in FIG. 1. Local computing devices 320A-320N may be, for example, clients 116-120 in FIG. 1.

Cloud computing nodes 310 may communicate with one another and may be grouped physically or virtually into one or more networks, such as private, community, public, or hybrid clouds as described hereinabove, or a combination thereof. This allows cloud computing environment 300 to offer infrastructure, platforms, and/or software as services for which a cloud consumer does not need to maintain resources on a local computing device, such as local computing devices 320A-320N. It is understood that the types of local computing devices 320A-320N are intended to be illustrative only and that cloud computing nodes 310 and cloud computing environment 300 can communicate with any type of computerized device over any type of network and/or network addressable connection using a web browser, for example.

Figure 4:
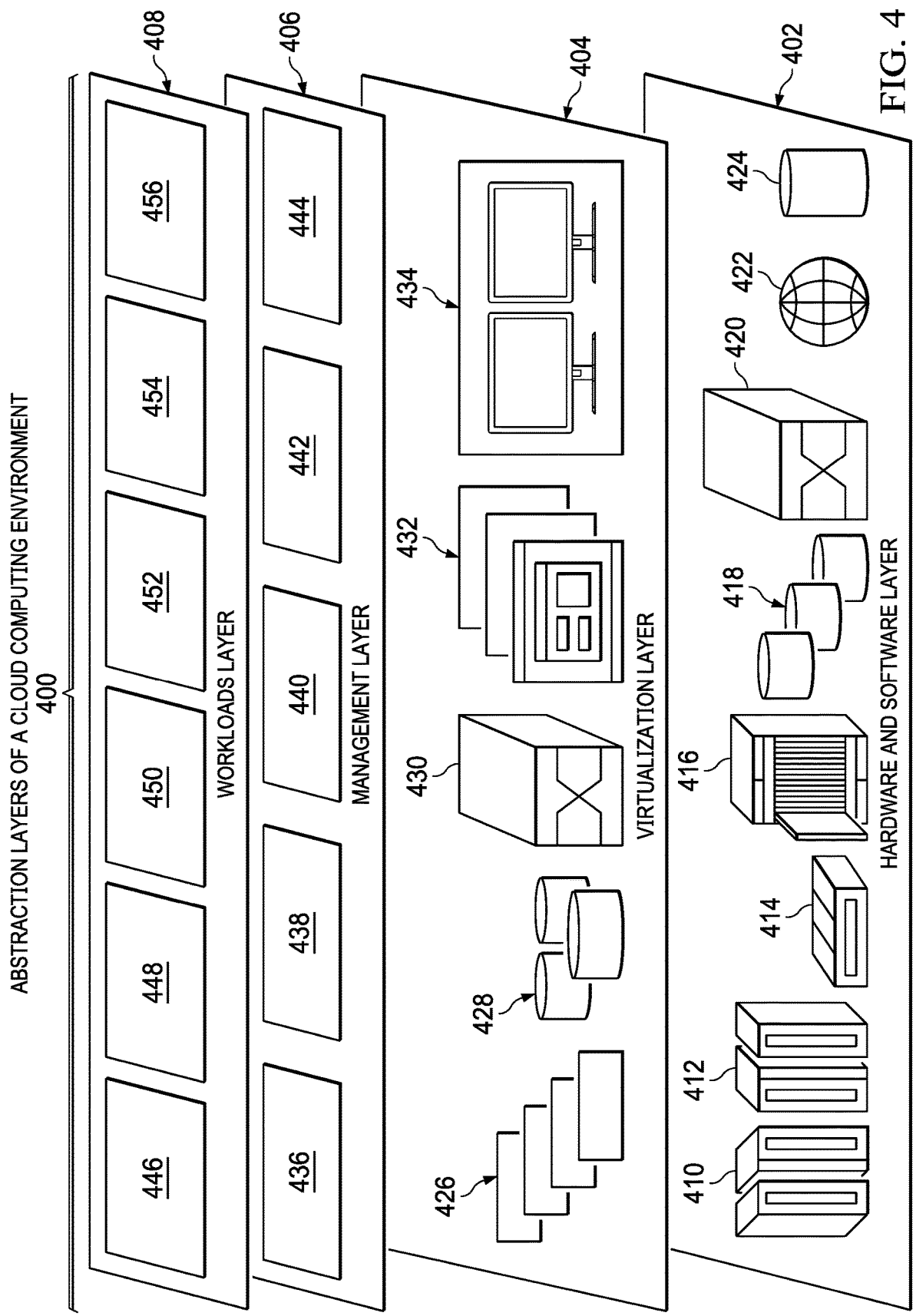
FIG. 4 is a diagram illustrating an example of abstraction layers of a cloud computing environment in accordance with an illustrative embodiment.

With reference now to FIG. 4, a diagram illustrating abstraction model layers is depicted in accordance with an illustrative embodiment. The set of functional abstraction layers shown in this illustrative example may be provided by a cloud computing environment, such as cloud computing environment 300 in FIG. 3. It should be understood in advance that the components, layers, and functions shown in FIG. 4 are intended to be illustrative only and embodiments of the invention are not limited thereto. As depicted, the following layers and corresponding functions are provided.

Abstraction layers of a cloud computing environment 400 include hardware and software layer 402, virtualization layer 404, management layer 406, and workloads layer 408. Hardware and software layer 402 includes the hardware and software components of the cloud computing environment. The hardware components may include, for example, mainframes 410, RISC (Reduced Instruction Set Computer) architecture-based servers 412, servers 414, blade servers 416, storage devices 418, and networks and networking components 420. In some illustrative embodiments, software components may include, for example, network application server software 422 and database software 424.

Virtualization layer 404 provides an abstraction layer from which the following examples of virtual entities may be provided: virtual servers 426; virtual storage 428; virtual networks 430, including virtual private networks; virtual applications and operating systems 432; and virtual clients 434.

In one example, management layer 406 may provide the functions described below. Resource provisioning 436 provides dynamic procurement of computing resources and other resources, which are utilized to perform tasks within the cloud computing environment. Metering and pricing 438 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 440 provides access to the cloud computing environment for consumers and system administrators. Service level management 442 provides cloud computing resource allocation and management such that required service levels are met. Service level agreement (SLA) planning and fulfillment 444 provides pre-arrangement for, and procurement of, cloud computing resources for which a future requirement is anticipated in accordance with an SLA.

Workloads layer 408 provides examples of functionality for which the cloud computing environment may be utilized. Example workloads and functions, which may be provided by workload layer 408, may include mapping and navigation 446, software development and lifecycle management 448, virtual classroom education delivery 450, data analytics processing 452, transaction processing 454, and server power usage management 456.

Currently, a control plane environment depends on a bootstrap file, which defines all the available cloud hardware resources to be used, to be available at time zero ("0") bootstrap. However, several issues exist with this approach. For example, uncontrolled or unbounded power consumption at time 0 bootstrap can exceed software-defined power limits on a zone, such as a fault zone, quality of service zone, or the like, of a data center and trip circuit breakers decreasing availability and reliability of the data center. In addition, new hardware resources (e.g., servers) after time 0 bootstrap can be added to currently running cloud hardware resources without adhering to the software-defined power limits on the zone, which may trip circuit breakers. Further, hardware resources may fail and need to be removed from available hardware resource inventory. However, no approach currently exists to reintroduce remote maintenance accessed hardware back into the cloud and avoid tripping the circuit breakers by adhering to the software-defined power limits on the zone.

Illustrative embodiments ensure that a cloud's power usage constraints are not exceeded during time 0 bootstrap or when new hardware inventory is added to a running cloud. Furthermore, illustrative embodiments determine how to add new hardware resources to the currently running cloud without impacting the cloud's current customers and staying within the cloud's power usage constraints. Moreover, illustrative embodiments are capable of removing hardware from the currently running cloud, having the removed hardware remote maintenance accessed or replaced, and then reintroducing the remote maintenance accessed hardware back into the cloud without exceeding the cloud's power usage constraints.

As an example illustration, a container orchestration environment, such as a Kubernetes cloud, is up and running and a new server rack is to be added to the data center. An integrated management system of illustrative embodiments adds information corresponding to the new server rack to the cloud's account. A resource inventory manager of illustrative embodiments retrieves the new server rack information, reads the information, and converts the information into a consumable rack inventory file. In addition, the resource inventory manager updates the electrical power topology of the data center.

The resource inventory manager informs a software-defined power manager of illustrative embodiments of the new server rack. Alternatively, the software-defined power manager may discover the new server rack by polling the resource inventory and associated electrical power topology. The software-defined power manager begins active controlling and monitoring of the new server rack in standby mode to measure power usage of the new server rack and set a power budget that will avoid tripping the circuit breakers. In addition, the software-defined power manager scales the power budget corresponding to the data center zone that will have the new server rack added. The software-defined power manager also spins-up a new additional software-defined power rack worker service for the new server rack.

Then, the software-defined power manager assigns the new server rack to the new software-defined power rack worker service. A software-defined power zone worker service, which is already running in the data center zone, assigns a power budget for the new server rack by redistributing existing zone power budget across all sever racks in the zone. The new software-defined power rack worker service corresponding to the new server rack actively controls and monitors the new server rack to maintain the assigned power budget for the new server rack.

It should be noted that if the resource inventory to be added to a zone is less than a sever rack (e.g., adding a single server), then the software-defined power manager may not need to spin-up a new additional software-defined power rack worker service when the server is added to a server rack already under control of an existing software-defined power rack worker service. The task of the existing software-defined power rack worker service of monitoring power consumption of the server rack to manage power usage is simply restarted with the updated server rack configuration. This allows illustrative embodiments to accommodate resource inventory changes of any granularity.

The software-defined power manager evaluates power safety criteria to determine whether the new server rack is ready to be added to the zone. The software-defined power manager confirms that power consumption measurements are being generated for the new server rack by the new software-defined power rack worker service. The software-defined power manager also confirms that the maximum power consumption by all server racks in the zone is under the defined power budget for the zone as a whole. In addition, the software-defined power manager calls a software-defined power application programming interface (API) to determine whether the new server rack is being power managed and is safe to be transitioned from standby mode to active mode based on the maximum server power consumption in the zone being under the defined power budget.

The resource inventory manager updates the resource inventory of the zone with the new server rack information. A control plane of the data center periodically checks for zone resource inventory changes by calling the resource inventory manager's APIs. The control plane notices the new server rack and retrieves the new server rack information, which includes necessary internet protocol (IP) addresses, baseboard management controller (BMC) media access control (MAC) addresses, 100 Gbps MAC addresses, and the like, and sends the information to the boot manager of illustrative embodiments. The boot manager begins the deploy boot process (e.g., iPXE, Petaboot, or the like), which includes power on for each new server in the rack. After the new servers come up, the new servers are then dynamically added to the corresponding software-defined power rack worker service.

Thus, illustrative embodiments provide one or more technical solutions that overcome a technical problem with monitoring and controlling server electric power usage in a data center of a container orchestration cloud environment when adding a new server rack or server to the data center without tripping the circuit breakers. As a result, these one or more technical solutions provide a technical effect and practical application in the field of data center server power consumption management.

Figure 5:
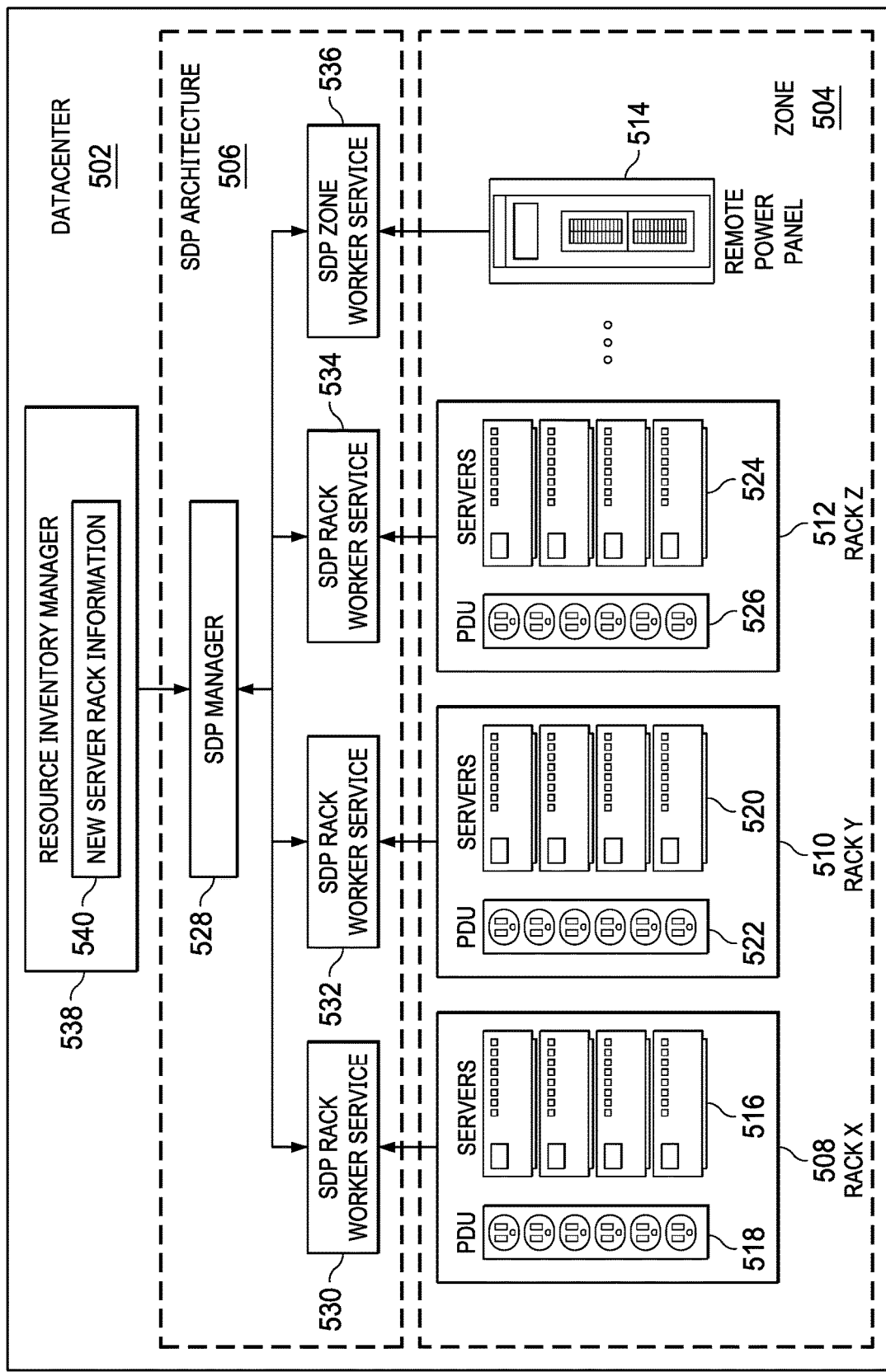
FIG. 5 is a diagram illustrating an example of a container orchestration cloud environment in accordance with an illustrative embodiment.

With reference now to FIG. 5, a diagram illustrating an example of a container orchestration environment is depicted in accordance with an illustrative embodiment. Container orchestration environment 500 may be implemented in a network of data processing systems, such as container orchestration environment 114 in network data processing system 100 of FIG. 1, or a cloud computing environment, such as cloud computing environment 300 in FIG. 3. Container orchestration environment 500 may be, for example, a Kubernetes cloud environment. Container orchestration environment 500 is a system of hardware and software components for monitoring and controlling server electric power usage in data center 502 when adding a new server rack to data center 502 to increase reliability and availability of data center 502.

In this example, data center 502 includes zone 504 and software-defined power architecture 506. However, it should be noted that data center 502 may include one or more other zones in addition to zone 504. Further, it should be noted that the acronym "SDP" in FIG. 5 represents the term "software-defined power". Also in this example, zone 504 includes server rack X 508, server rack Y 510, server rack Z 512, and remote power panel 514. However, it should be noted that zone 504 may include more or fewer server racks than shown. In other words, zone 504 may include any number of server racks. Remote power panel 514 is a standalone electric power distribution unit that includes a plurality of electric power distribution circuit breakers for zone 504.

Further in this example, server rack X 508 includes servers 516 and power distribution unit ("PDU") 518, server rack Y 510 includes servers 520 and PDU 522, and server rack Z 512 includes servers 524 and PDU 526. Servers 516, servers 520, and servers 524 each represent a plurality of hardware servers. PDU 518, PDU 522, and PDU 526 each represent a rack-mounted power distribution device fitted with multiple power outlets designed to provide electric power to servers 516, servers 520, and servers 524, respectively. Servers 516, servers 520, and servers 524 are in active mode executing a set of one or more workloads, such as workload 228 in FIG. 2.

Software-defined power architecture 506 includes software-defined power manager 528, software-defined power rack worker service 530, software-defined power rack worker service 532, software-defined power rack worker service 534, and software-defined power zone worker service 536. Software-defined power manager 528, software-defined power rack worker services 530-534, and software-defined power zone worker service 536 may be, for example, software-defined power manager 234, rack worker services 236, and zone worker service 238 in FIG. 2. Software-defined power rack worker service 530, software-defined power rack worker service 532, software-defined power rack worker service 534 collect and monitor power consumption data for servers 516, servers 520, and servers 524, respectively. In other words, software-defined power manager 528 utilizes one rack worker service to monitor electric power usage of one rack of servers. Software-defined power manager 528 utilizes software-defined power zone worker service 536 to monitor electric power flow through remote power panel 514. Software-defined power manager 528 utilizes the information gathered from software-defined power rack worker services 530-534 and software-defined power zone worker service 536 to ensure that the total power consumption of all servers running in zone 504 does not exceed as a defined server power consumption budget constraint corresponding to zone 504.

Data center 502 also includes resource inventory manager 538. Resource inventory manager 538 may be, for example, resource inventory manager 218 in FIG. 2. Resource inventory manager 538 monitors and controls the hardware inventory (e.g., servers) of data center 502. Resource inventory manager 538 utilizes new server rack information 540 to add a new rack of servers to zone 504. New server rack information 540 may be, for example, rack inventory file 232 in FIG. 2. When resource inventory manager 538 receives confirmation from software-defined power manager 528 that it is safe to add the new server rack to zone 504 without exceeding the power budget to avoid tripping the circuit breakers of remote power panel 514 based on power safety criteria being met, then resource inventory manager 538 adds the new server rack to the resource inventory of zone 504 and instructs software-defined power manager 528 to spin-up another software-defined power rack worker service to collect and monitor power consumption data corresponding to the newly added server rack.

Figure 6A:
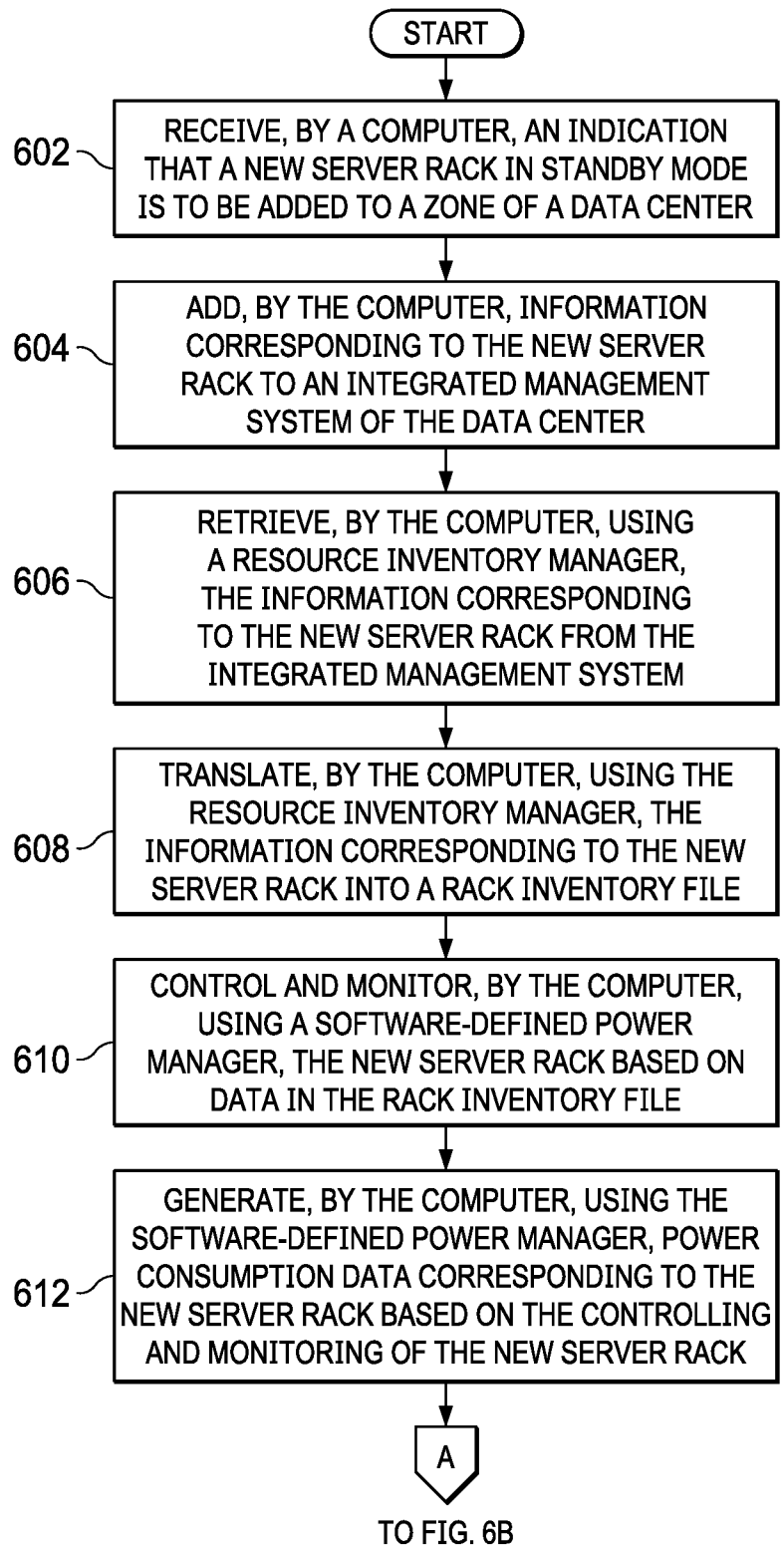
FIGS. 6A-6B are a flowchart illustrating a process for adding a new server rack to a data center zone without exceeding a zone power budget in accordance with an illustrative embodiment.
Figure 6B:
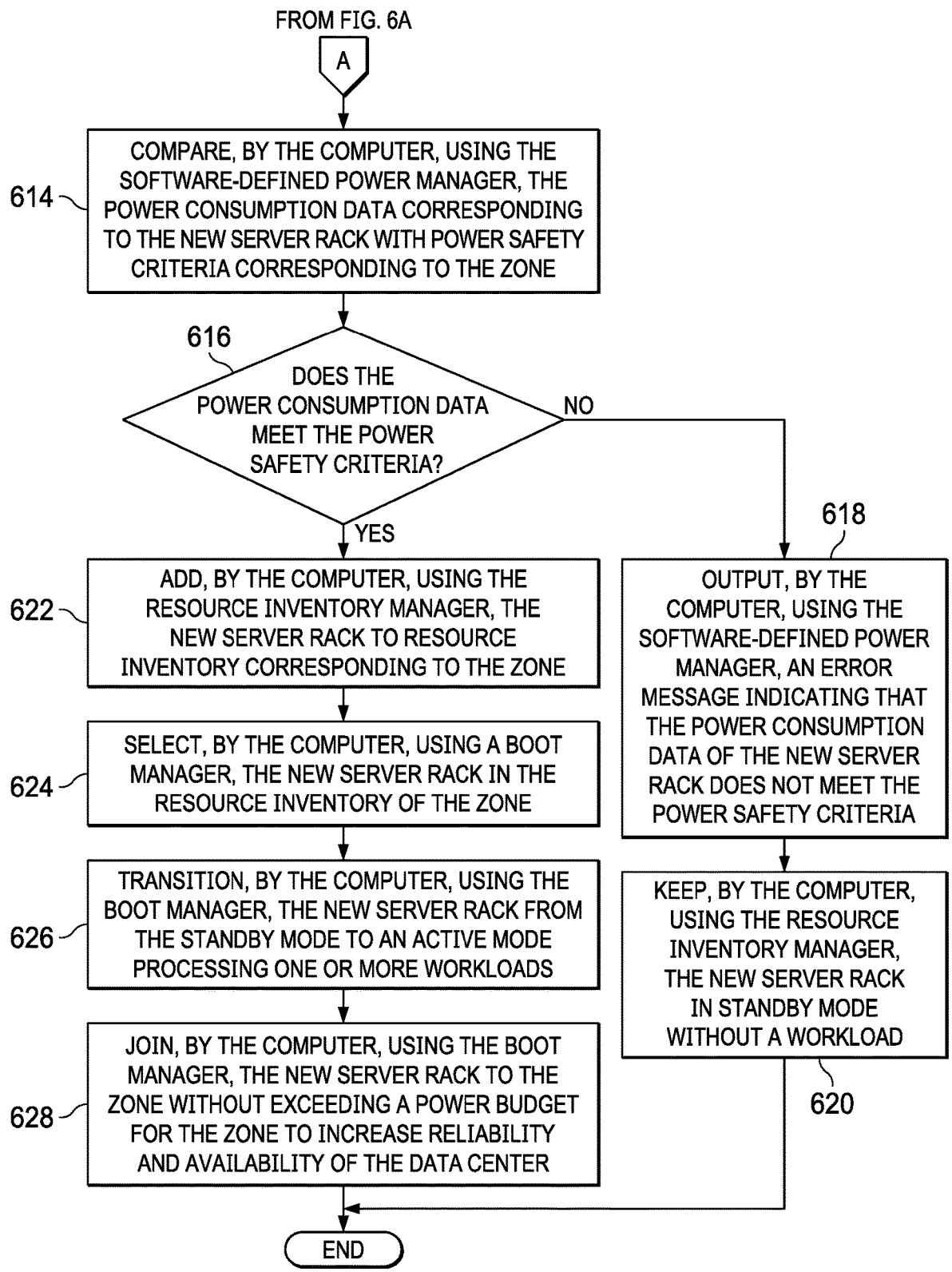

With reference now to FIGS. 6A-6B, a flowchart illustrating a process for adding a new server rack to a data center zone without exceeding a zone power budget is shown in accordance with an illustrative embodiment. The process shown in FIGS. 6A-6B may be implemented in a computer, such as, for example, management server 108 in FIG. 1, data processing system 200 in FIG. 2, or a cloud computing node in cloud computing nodes 310 in FIG. 3.

The process begins when the computer receives an indication that a new server rack in standby mode is to be added to a zone of a data center (step 602). The standby mode is one of a no power state or a low power state without processing any workload. The zone may include a plurality of server racks processing a set of one or more workloads and may be one zone in a set of one or more zones in the data center. The set of workloads may include any type of data processing workload or service.

In response to receiving the indication that the new server rack is to be added to the zone in step 602, the computer adds information corresponding to the new server rack to an integrated management system of the data center (step 604). The computer, using a resource inventory manager, retrieves the information corresponding to the new server rack from the integrated management system (step 606). In addition, the computer, using the resource inventory manager, translates the information corresponding to the new server rack into a rack inventory file (step 608).

The computer, using a software-defined power manager, controls and monitors the new server rack based on data in the rack inventory file (step 610). Further, the computer, using the software-defined power manager, generates power consumption data corresponding to the new server rack based on the software-defined power manager controlling and monitoring the new server rack (step 612). The computer, using the software-defined power manager, compares the power consumption data corresponding to the new server rack with power safety criteria corresponding to the zone (step 614).

The computer makes a determination as to whether the power consumption data for the new server rack meets the power safety criteria (step 616). If the computer determines that the power consumption data for the new server rack does not meet the power safety criteria, no output of step 616, then the computer, using the software-defined power manager, outputs an error message indicating that the power consumption data of the new server rack does not meet the power safety criteria (step 618). Moreover, the computer, using the resource inventory manager, keeps the new server rack in standby mode without processing any workload (step 620). Thereafter, the process terminates.

Returning again to step 616, if the computer determines that the power consumption data for the new server rack does meet the power safety criteria, yes output of step 616, then the computer, using the resource inventory manager, adds the new server rack to resource inventory corresponding to the zone (step 622). Further, the computer, using a boot manager, selects the new server rack in the resource inventory of the zone (step 624). The computer, using the boot manager, transitions the new server rack from the standby mode to an active mode processing one or more workloads (step 626). Furthermore, the computer, using the boot manager, joins the new server rack to the zone without exceeding a power budget for the zone to increase reliability and availability of the data center (step 628). Thereafter, the process terminates.

Figure 7:
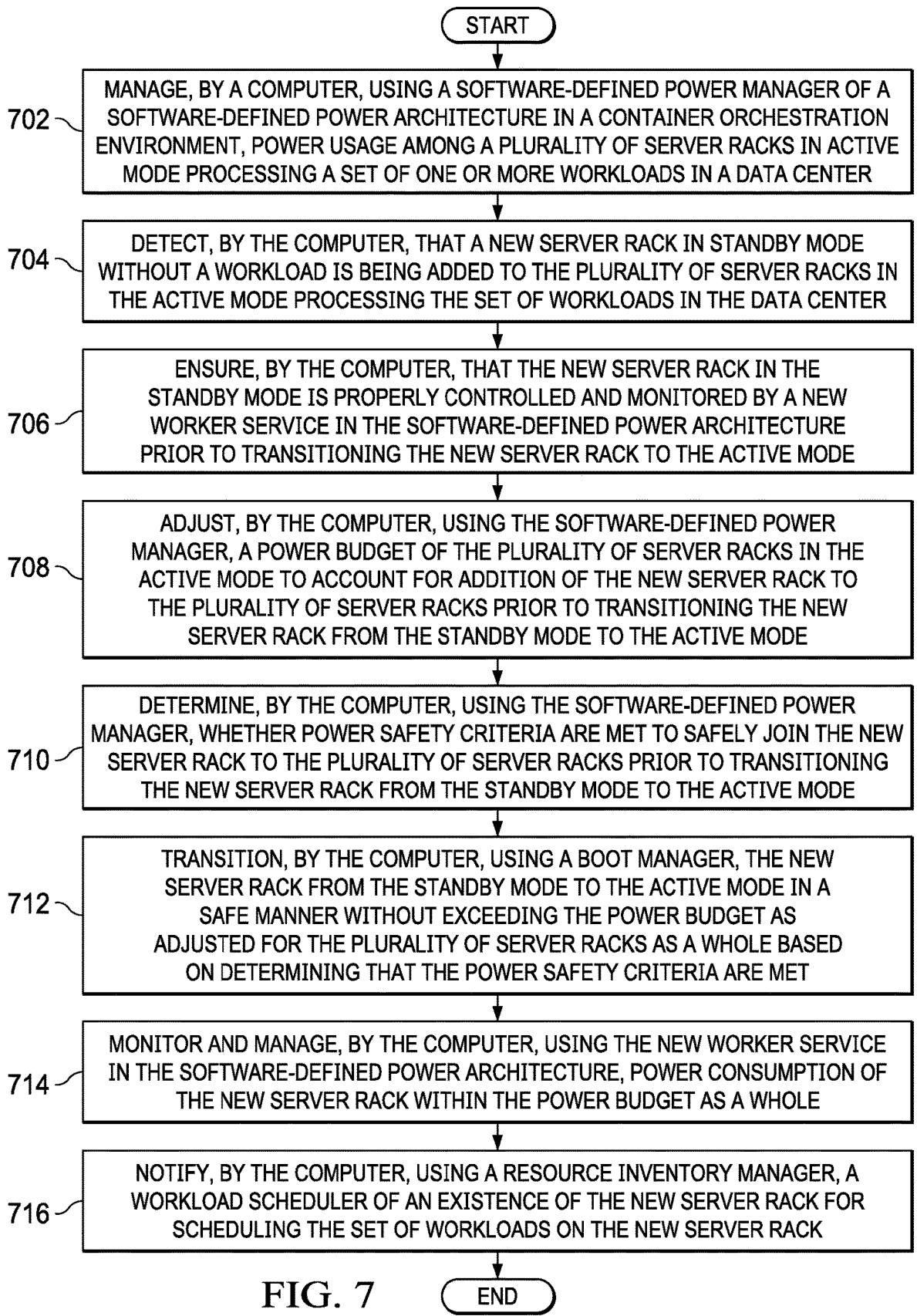
FIG. 7 is a flowchart illustrating a process for managing server power usage in accordance with an illustrative embodiment.

With reference now to FIG. 7, a flowchart illustrating a process for managing server power usage is shown in accordance with an illustrative embodiment. The process shown in FIG. 7 may be implemented in a computer, such as, for example, management server 108 in FIG. 1, data processing system 200 in FIG. 2, or a cloud computing node in cloud computing nodes 310 in FIG. 3.

The process begins when the computer, using a software-defined power manager of a software-defined power architecture in a container orchestration environment, manages power usage among a plurality of server racks in active mode processing a set of one or more workloads in a data center (step 702). The computer, using a resource inventory manager, also detects that a new server rack in standby mode without a workload is being added to the plurality of server racks in the active mode processing the set of workloads in the data center (step 704). In addition, the computer ensures that the new server rack in the standby mode is properly controlled and monitored by a new software-defined power worker service in the software-defined power architecture prior to transitioning the new server rack to the active mode (step 706). The software-defined power architecture includes a plurality of software-defined power worker services under the control of the software-defined power manager. Each monitors a corresponding server rack in active mode to manage power usage of that server rack in the plurality of server racks.

The computer, using the software-defined power manager, adjusts a power budget of the plurality of server racks in the active mode to account for addition of the new server rack to the plurality of server racks prior to transitioning the new server rack from the standby mode to the active mode (step 708). Further, the computer, using the software-defined power manager, determines whether power safety criteria are met to safely join the new server rack to the plurality of server racks prior to transitioning the new server rack from the standby mode to the active mode (step 710). The computer, using a boot manager, transitions the new server rack from the standby mode to the active mode in a safe manner without exceeding the power budget as adjusted for the plurality of server racks as a whole based on determining that the power safety criteria are met (step 712). The computer, using the new software-defined power worker service in the software-defined power architecture, monitors and manages power consumption of the new server rack within the power budget as a whole (step 714). The computer, using a resource inventory manager, notifies a workload scheduler of an existence of the new server rack for scheduling the set of workloads on the new server rack (step 716). Thereafter, the process terminates.

Thus, illustrative embodiments of the present invention provide a computer-implemented method, computer system, and computer program product for controlling server power usage in a data center of a container orchestration cloud environment. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for controlling server power usage in a data center, the method comprising:
    managing, using a software-defined power (SDP) architecture, power usage among a plurality of server racks in active mode processing a set of workloads in the data center, wherein each server rack of the plurality of server racks comprises a plurality of hardware servers, wherein each server rack of the plurality of server racks is associated with a corresponding SDP worker service in the SDP architecture;
    detecting, using a resource inventory manager, that a new server rack in standby mode without a workload is being added to the plurality of server racks in the active mode processing the set of workloads in the data center;
    ensuring, using the SDP architecture, that the new server rack in the standby mode is properly controlled and monitored by a new SDP worker service in the SDP architecture prior to transitioning the new server rack to the active mode, wherein the new SDP worker service in the SDP architecture is associated with the new server rack;
    determining, using the SDP architecture, whether power safety criteria are met to safely join the new server rack to the plurality of server racks prior to transitioning the new server rack from the standby mode to the active mode;
    transitioning, using a boot manager, the new server rack from the standby mode to the active mode in a safe manner without exceeding a power budget for the plurality of server racks in response to the SDP architecture determining that the power safety criteria are met, wherein the boot manager begins a boot deploy process that includes powering up the new server rack;
    assigning, using the SDP architecture, the new server rack to the new SDP worker service, wherein the new SDP worker service controls and monitors power consumption data for the new server rack;
    adjusting, using the SDP architecture, the power budget of the plurality of server racks in the active mode to account for addition of the new server rack to the plurality of server racks prior to the boot manager transitioning the new server rack from the standby mode to the active mode; and
    remotely managing, via a network and using the new SDP worker service in the SDP architecture, power consumption of the new server rack within the power budget for the plurality of server racks as a whole, wherein the new SDP worker service is a service running on a management rack within a zone that comprises the plurality of server racks and a remote power panel that includes a plurality of electric power circuit breakers for the zone,
    wherein the SDP architecture, the resource inventory manager, and the boot manager, are each operable on one or more computer systems separate from the plurality of server racks and separate from the new server rack.

2. The method of claim 1 further comprising:
    notifying, using the resource inventory manager that detected the new server rack, a workload scheduler of an existence of the new server rack for scheduling the set of workloads on the new server rack.

3. The method of claim 1 further comprising:
    receiving, using the resource inventory manager that detected the new server rack, an indication that the new server rack in the standby mode is to be added to a the zone;
    retrieving, using the resource inventory manager that detected the new server rack, information corresponding to the new server rack from an integrated management system; and
    translating, using the resource inventory manager that detected the new server rack, the information corresponding to the new server rack retrieved from the integrated management system into a rack inventory file.

4. The method of claim 3 further comprising:
    controlling and monitoring, using the new SDP worker service in the SDP architecture, the new server rack in the standby mode based on data in the rack inventory file; and
    generating, using the new SDP worker service in the SDP architecture, power consumption data corresponding to the new server rack based on the controlling and monitoring of the new server rack using the new SDP worker service in the SDP architecture.

5. The method of claim 4 further comprising:
    comparing the power consumption data corresponding to the new server rack with the power safety criteria corresponding to the zone; and
    determining whether the power consumption data corresponding to the new server rack meets the power safety criteria corresponding to the zone.

6. The method of claim 5 further comprising:
    responsive to determining that the power consumption data for the new server rack does not meet the power safety criteria corresponding to the zone, outputting an error message indicating that the power consumption data of the new server rack does not meet the power safety criteria corresponding to the zone and keeping the new server rack in the standby mode without processing any workload.

7. The method of claim 5 further comprising:
    responsive to determining that the power consumption data for the new server rack does meet the power safety criteria corresponding to the zone, adding the new server rack to resource inventory corresponding to the zone, selecting the new server rack in the resource inventory of the zone, transitioning the new server rack from the standby mode to the active mode processing the set of workloads, and joining the new server rack to the zone without exceeding the power budget for the zone to increase reliability and availability of the data center.

8. The method of claim 1, wherein the SDP architecture includes (i) a plurality of SDP worker services under control of a SDP manager and (ii) an SDP zone worker service that monitors electric power flow through a power panel under control of the SDP manager, and wherein each SDP worker service in the plurality of SDP worker services controls and monitors a corresponding server rack in the active mode to manage power usage of that server rack in the plurality of server racks.

9. The method of claim 1, wherein the standby mode is a low power state without processing any workload.

10. A computer system for controlling server power usage in a data center, the computer system comprising:
  a bus system;
  a storage device connected to the bus system, wherein the storage device stores program instructions; and
  a processor connected to the bus system, wherein the processor executes the program instructions to:
    manage, using a software-defined power (SDP) architecture, power usage among a plurality of server racks in active mode processing a set of workloads in the data center, wherein each server rack of the plurality of server racks comprises a plurality of hardware servers, wherein each server rack of the plurality of server racks is associated with a corresponding SDP worker service in the SDP architecture;
    detect, using a resource inventory manager, that a new server rack in standby mode without a workload is being added to the plurality of server racks in the active mode processing the set of workloads in the data center;
    ensure, using the SDP architecture, that the new server rack in the standby mode is properly controlled and monitored by a new SDP worker service in the SDP architecture prior to transitioning the new server rack to the active mode, wherein the new SDP worker service in the SDP architecture is associated with the new server rack;
    determine, using the SDP architecture, whether power safety criteria are met to safely join the new server rack to the plurality of server racks prior to transitioning the new server rack from the standby mode to the active mode;
    transition, using a boot manager, the new server rack from the standby mode to the active mode in a safe manner without exceeding a power budget for the plurality of server racks in response to the SDP architecture determining that the power safety criteria are met, wherein the boot manager begins a boot deploy process that includes powering up the new server rack;
    assign, using the SDP architecture, the new server rack to the new SDP worker service, wherein the new SDP worker service controls and monitors power consumption data for the new server rack;
    adjust, using the SDP architecture, the power budget of the plurality of server racks in the active mode to account for addition of the new server rack to the plurality of server racks prior to the boot manager transitioning the new server rack from the standby mode to the active mode; and
    remotely manage, via a network and using the new SDP worker service in the SDP architecture, power consumption of the new server rack within the power budget for the plurality of server racks as a whole, wherein the new SDP service is a service running on a management rack within a zone that comprises the plurality of server racks and a remote power panel that includes a plurality of electric power circuit breakers for the zone,
    wherein the SDP architecture, the resource inventory manager, and the boot manager, are each operable on one or more computer systems separate from the plurality of server racks and separate from the new server rack.

11. The computer system of claim 10, wherein the processor further executes the program instructions to:
  notifying, using the resource inventory manager that detected the new server rack, a workload scheduler of an existence of the new server rack for scheduling the set of workloads on the new server rack.

12. A computer program product for controlling server power usage in a data center, the computer program product comprising a computer readable storage medium having program instructions embodied therewith, the program instructions executable by a computer to cause the computer to perform a method comprising:
  managing, using a software-defined power (SDP) architecture, power usage among a plurality of server racks in active mode processing a set of workloads in the data center, wherein each server rack of the plurality of server racks comprises a plurality of hardware servers, wherein each server rack of the plurality of server racks is associated with a corresponding SDP worker service in the SDP architecture;
  detecting, using a resource inventory manager, that a new server rack in standby mode without a workload is being added to the plurality of server racks in the active mode processing the set of workloads in the data center;
  ensuring, using the SDP architecture, that the new server rack in the standby mode is properly controlled and monitored by a new SDP worker service in the SDP architecture prior to transitioning the new server rack to the active mode, wherein the new SDP worker service in the SDP architecture is associated with the new server rack;
  determining, using the SDP architecture, whether power safety criteria are met to safely join the new server rack to the plurality of server racks prior to transitioning the new server rack from the standby mode to the active mode;
  transitioning, using a boot manager, the new server rack from the standby mode to the active mode in a safe manner without exceeding a power budget for the plurality of server racks in response to the SDP architecture determining that the power safety criteria are met, wherein the boot manager begins a boot deploy process that includes powering up the new server rack;
  assigning, using the SDP architecture, the new server rack to the new SDP worker service, wherein the new SDP worker service controls and monitors power consumption data for the new server rack;
  adjusting, using the SDP architecture, the power budget of the plurality of server racks in the active mode to account for addition of the new server rack to the plurality of server racks prior to the boot manager transitioning the new server rack from the standby mode to the active mode; and remotely managing, via a network and using the new SDP worker service in the SDP architecture, power consumption of the new server rack within the power budget for the plurality of server racks as a whole, wherein the new SDP service is a service running on a management rack within a zone that comprises the plurality of server racks and a remote power panel that includes a plurality of electric power circuit breakers for the zone, wherein the SDP architecture, the resource inventory manager, and the boot manager, are each operable on one or more computer systems separate from the plurality of server racks and separate from the new server rack.

13. The computer program product of claim 12 further comprising:

notifying, using the resource inventory manager that detected the new server rack, a workload scheduler of an existence of the new server rack for scheduling the set of workloads on the new server rack.

14. The computer program product of claim 12 further comprising:

receiving, using the resource inventory manager that detected the new server rack, an indication that the new server rack in the standby mode is to be added to the zone;

retrieving, using the resource inventory manager that detected the new server rack, information corresponding to the new server rack from an integrated management system; and translating, using the resource inventory manager that detected the new server rack, the information corresponding to the new server rack retrieved from the integrated management system into a rack inventory file;

controlling and monitoring, using the new SDP worker service in the SDP architecture, the new server rack in the standby mode based on data in the rack inventory file; and generating, using the new SDP worker service in the SDP architecture, power consumption data corresponding to the new server rack based on the controlling and monitoring of the new server rack using the new SDP worker service in the SDP architecture.

* * * * *